United States Patent
Hayford et al.

(10) Patent No.: US 10,167,738 B2
(45) Date of Patent: Jan. 1, 2019

(54) COMPRESSOR CASE SNAP ASSEMBLY

(71) Applicant: United Technologies Corporation, Hartford, CT (US)

(72) Inventors: Richard K. Hayford, Cape Neddick, ME (US); Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 554 days.

(21) Appl. No.: 14/775,726

(22) PCT Filed: Feb. 26, 2014

(86) PCT No.: PCT/US2014/018652
§ 371 (c)(1),
(2) Date: Sep. 14, 2015

(87) PCT Pub. No.: WO2014/158600
PCT Pub. Date: Oct. 2, 2014

(65) Prior Publication Data
US 2016/0040555 A1 Feb. 11, 2016

Related U.S. Application Data

(60) Provisional application No. 61/782,271, filed on Mar. 14, 2013.

(51) Int. Cl.
*F01D 25/28* (2006.01)
*F04D 29/02* (2006.01)
(Continued)

(52) U.S. Cl.
CPC .............. *F01D 25/28* (2013.01); *F01D 11/08* (2013.01); *F01D 25/24* (2013.01); *F01D 25/243* (2013.01); *F02C 3/04* (2013.01); *F02C 7/28* (2013.01); *F04D 29/023* (2013.01); *F04D 29/083* (2013.01); *F04D 29/164* (2013.01); *F04D 29/526* (2013.01); *F04D 29/644* (2013.01);
(Continued)

(58) Field of Classification Search
CPC .......... F01D 11/04; F01D 11/08; F01D 11/10; F01D 25/24; F01D 25/243; F01D 25/28
See application file for complete search history.

(56) References Cited

U.S. PATENT DOCUMENTS 5,462,403 A 10/1995 Pannone
5,899,660 A 5/1999 Dodd
(Continued)

FOREIGN PATENT DOCUMENTS

DE 102011108957 1/2013
EP 2113583 11/2009
JP 2005002880 1/2005

OTHER PUBLICATIONS

Supplementary European Search Report for Application No. 14776516.8 dated Sep. 13, 2016.
(Continued)

*Primary Examiner* — Arun Goyal
(74) *Attorney, Agent, or Firm* — Carlson, Gaskey & Olds, P.C.

(57) ABSTRACT

A turbine engine case spacer includes an air seal and a flange. The air seal is snap fit to the flange, and each flange includes at least two distinct material layers.

17 Claims, 4 Drawing Sheets

(51) Int. Cl.
  *F04D 29/16* (2006.01)
  *F04D 29/52* (2006.01)
  *F04D 29/64* (2006.01)
  *F01D 11/08* (2006.01)
  *F01D 25/24* (2006.01)
  *F02C 3/04* (2006.01)
  *F02C 7/28* (2006.01)
  *F04D 29/08* (2006.01)

(52) U.S. Cl.
  CPC ...... *F05D 2220/30* (2013.01); *F05D 2230/31* (2013.01); *F05D 2230/60* (2013.01); *F05D 2240/11* (2013.01); *F05D 2240/55* (2013.01); *F05D 2300/50212* (2013.01)

(56) References Cited

U.S. PATENT DOCUMENTS

| | | | |
|---|---|---|---|
| 7,797,948 B2 * | 9/2010 | Weaver | F01D 9/023 277/399 |
| 8,016,549 B2 | 9/2011 | Shah et al. | |
| 8,329,092 B2 | 12/2012 | Fuwa et al. | |
| 8,375,548 B2 | 2/2013 | Stastny et al. | |
| 2003/0140633 A1 | 7/2003 | Shimizu et al. | |
| 2009/0255262 A1 | 10/2009 | McMasters et al. | |
| 2010/0180417 A1 | 7/2010 | Anantharaman et al. | |
| 2011/0044804 A1 | 2/2011 | DiPaola et al. | |
| 2011/0217158 A1 | 9/2011 | Grissino et al. | |
| 2014/0035240 A1 * | 2/2014 | Sha | F01D 11/003 277/641 |

OTHER PUBLICATIONS

International Search Report for PCT Application No. PCT/US2014/018652 dated Jun. 10, 2014.

International Preliminary Report on Patentability for PCT Application No. PCT/US2014/018652, dated Sep. 24, 2015.

* cited by examiner

COMPRESSOR CASE SNAP ASSEMBLY

TECHNICAL FIELD

The present disclosure is directed toward inner or outer case snap assemblies for turbine engines, and more particularly toward an improved spacer design for the same.

BACKGROUND OF THE INVENTION

Modern commercial aircraft utilize turbine engines that include a compressor having an inner diameter case and inner air seals to prevent airflow leakage through the inner diameter case. Large interference fits are used to ensure that snaps (connections between the inner air seals and the inner diameter case) on the inner air seals remain tight under all engine flight conditions, such as engine fire up, cruising, and engine cool down. The snap fits are made tight under all conditions in order to minimize air leakage causing an efficiency loss and to minimize slippage of adjacent parts when the engine is under load. The tight fit is created by preloading the snaps during installation, thereby mitigating variation in fit due to thermal expansion.

As a byproduct of preloading the snaps, significant force is required during assembly, and some parts require high heat or extreme cold in order to facilitate the assembly. Further exacerbated by the tight fit snaps is the possibility that the inner air seal and/or the inner diameter case can be damaged during disassembly resulting in costly repairs that are otherwise unnecessary.

SUMMARY OF THE INVENTION

A turbine engine according to an exemplary embodiment of this disclosure, among other possible things includes a compressor section including a compressor case, a combustor in fluid communication with the compressor section, a turbine section in fluid communication with the combustor, the compressor case includes a plurality of case spacers, each of the case spacers having at least one flange, at least one air seal, each of the flanges is separated from an adjacent component by one of the at least one air seals, the at least one seal is snap fit to the flange, and at least one of the flanges includes at least two distinct material layers.

In a further embodiment of the foregoing turbine engine, the at least one flange is constructed via an additive manufacturing process.

In a further embodiment of the foregoing turbine engine, each of the material layers has a unique thermal expansion coefficient, and each of the thermal expansion coefficients is different from the thermal expansion coefficient of each other layer.

In a further embodiment of the foregoing turbine engine, each layer includes a uniform material layer.

In a further embodiment of the foregoing turbine engine, each layer includes a gradient of material composition.

In a further embodiment of the foregoing turbine engine, the gradient has a higher concentration of a first material relative to a second material on a first radial edge of the layer, and a higher concentration of the second material relative to the first material on a second radial edge of the layer.

In a further embodiment of the foregoing turbine engine, the gradient of material composition has a higher concentration of a first material relative to a second material on a first axial edge of the layer, and a higher concentration of the second material relative to the first material on a second axial edge of the layer.

In a further embodiment of the foregoing turbine engine, each flange is connected to a corresponding adjacent component using a fastener.

In a further embodiment of the foregoing turbine engine, the fastener is a bolt and nut arrangement.

In a further embodiment of the foregoing turbine engine, each of the spacers is a single monolithic component.

In a further embodiment of the foregoing turbine engine, the at least two distinct material layers comprise at least a first spacer layer, a second intermediate layer, and a third flange layer, wherein each of the layers comprises a unique coefficient of thermal expansion, and the coefficient of thermal expansion of the second intermediate layer is between the coefficient of thermal expansion of the first spacer layer and the coefficient of thermal expansion of the third flange layer.

A turbine engine according to an exemplary embodiment of this disclosure, among other possible things includes a plurality of case spacers, each of the case spacers having at least one flange, at least one outer air seal, each of the flanges is separated from an adjacent component by one of the at least one outer air seals, the at least one outer air seal is snap fit to the flange, and each of the flanges is constructed via an additive manufacturing process and includes at least two distinct material layers.

In a further embodiment of the foregoing turbine engine, each of the flanges is constructed of an additive manufacturing process.

In a further embodiment of the foregoing turbine engine, the additive manufacturing process is laser sintering.

In a further embodiment of the foregoing turbine engine, each of the material layers has a unique thermal expansion coefficient, and each of the thermal expansion coefficients is different from the thermal expansion coefficient of each other layer.

In a further embodiment of the foregoing turbine engine, each layer is a uniform material layer.

In a further embodiment of the foregoing turbine engine, each layer is a gradient of material composition.

In a further embodiment of the foregoing turbine engine, the gradient has a higher concentration of a first material relative to a second material on a first radial edge of the layer, and a higher concentration of the second material relative to the first material on a second radial edge of the layer.

In a further embodiment of the foregoing turbine engine, the gradient of material composition has a higher concentration of a first material relative to a second material on a first axial edge of the layer, and a higher concentration of the second material relative to the first material on a second axial edge of the layer.

In a further embodiment of the foregoing turbine engine, each flange is connected to a corresponding adjacent component using a fastener.

In a further embodiment of the foregoing turbine engine, the fastener is a bolt and nut arrangement.

In a further embodiment of the foregoing turbine engine, each of the spacers is a single monolithic component.

In a further embodiment of the foregoing turbine engine, the at least two distinct material layers comprises at least a first spacer layer, a second intermediate layer, and a third flange layer, wherein each of the layers includes a unique coefficient of thermal expansion, and the coefficient of thermal expansion of the second intermediate layer is between the coefficient of thermal expansion of the first spacer layer and the coefficient of thermal expansion of the third flange layer.

These and other features of the present invention can be best understood from the following specification and drawings, the following of which is a brief description.

DETAILED DESCRIPTION OF AN EMBODIMENT

Figure 1:
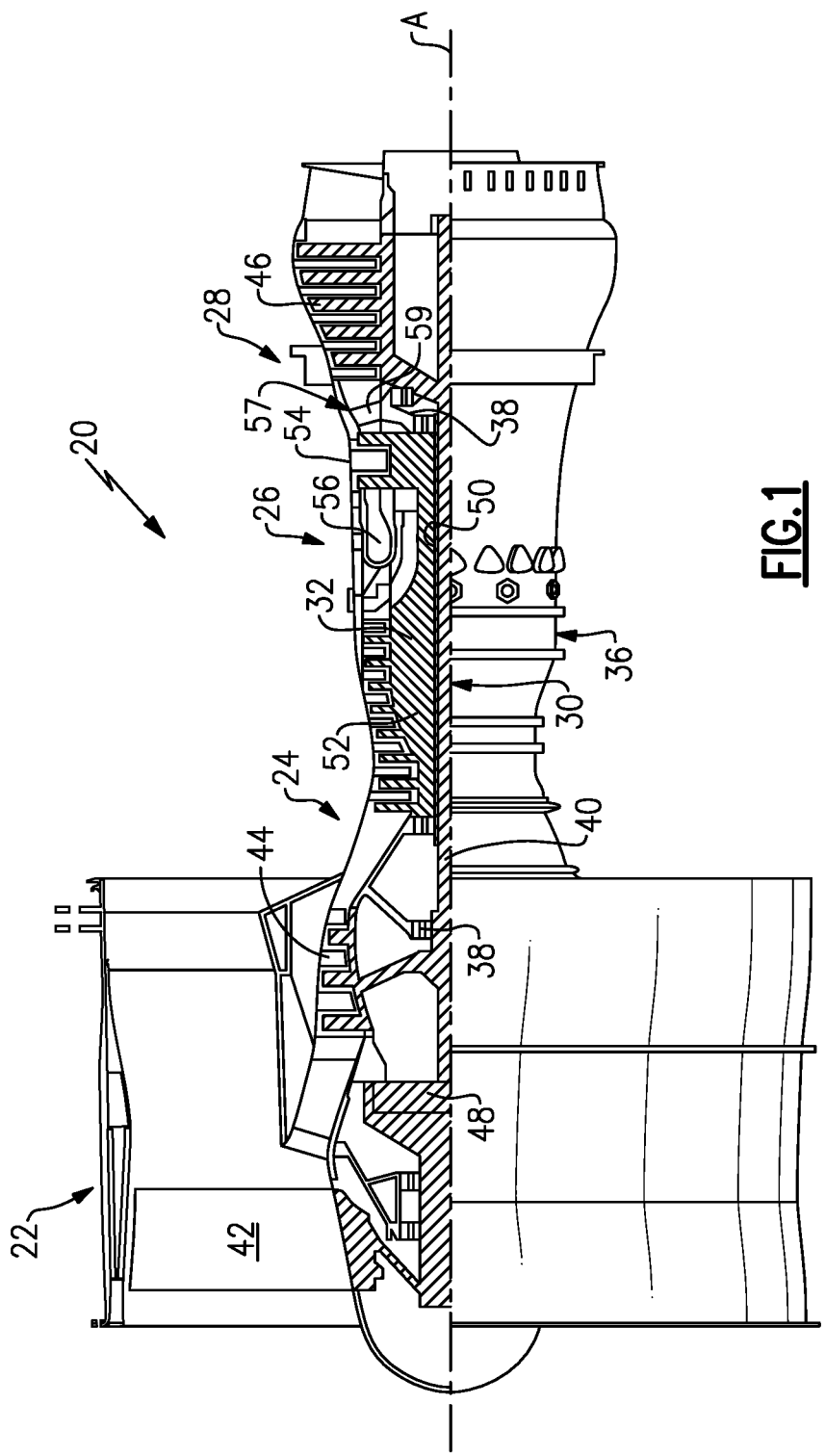
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
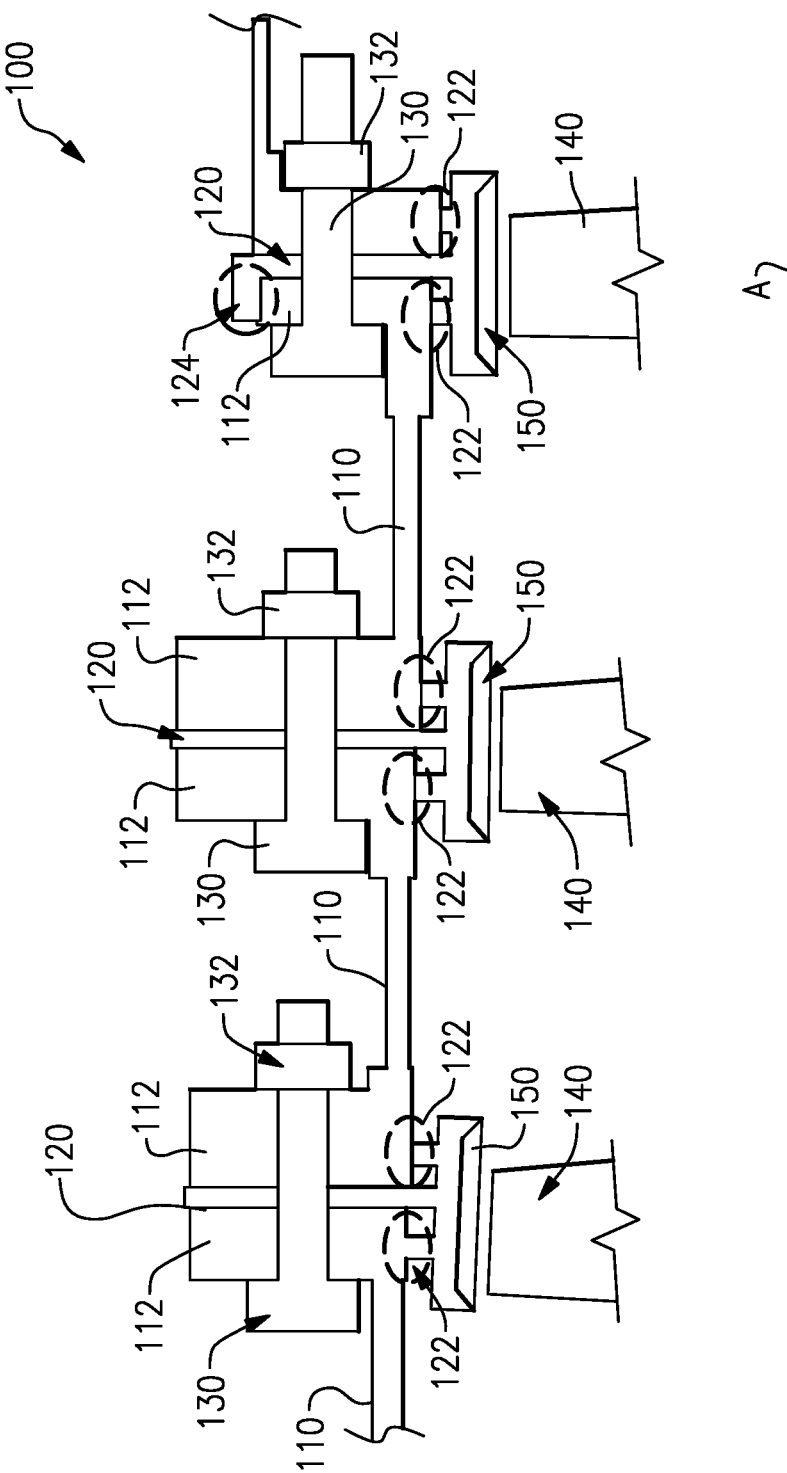
FIG. 2 schematically illustrates an outer diameter compressor case assembly.

FIG. 2 schematically illustrates a partial view of an inner diameter compressor case assembly 100. The inner diameter compressor case assembly 100 includes multiple inner diameter case spacers 110 disposed along the engine centerline axis A. Each of the inner diameter case spacers 110 includes a spacer flange 112 on each axial end of the spacer 110. Each spacer flange 112 contacts an adjacent inner air seal 120.

The inner air seals 120 include snap fits 122 that are tight fit to the spacers 110, thereby minimizing air leakage between the flange 112 and the inner air seal 120 and slippage of adjacent parts when the engine 20 is under load. The inner air seals 120 further include rotor contact surfaces 150 that face corresponding rotor blades 140 within the compressor section 24. The rotor contact surfaces 150 are abradable, thereby preventing wear on the rotor blades 140 in the event that a contact between the rotor blade 140 and the corresponding rotor contact surface 150 occurs. In some embodiments, the inner air seals 120 include only radially outward facing snaps 122. Other embodiments include radially inward facing reverse snaps 124.

Each inner air seal 120 is located between two adjacent flanges 112, with each of the flanges 112 corresponding to separate, adjacent, inner diameter case spacers 110. The flanges 112 are connected to each other via the use of a fastener assembly that protrudes through each of the flanges 112 and the corresponding inner air seal 120. In the example of FIG. 2, the fastener assembly is a threaded bolt 130 that protrudes through the flanges 112 and the inner air seal 120 and a nut 132 tightened to the threads of the bolt 130.

Each inner diameter case spacer 110 is constructed using an additive manufacturing process, such as a laser sintering metallurgy process. The additive manufacturing process applies individual layers of a material to construct the three dimensional geometry of the spacer 110. Additive manufacturing allows for a three dimensional component with a complex geometry to be manufactured without requiring the utilization of milling or other methods of removing material from a workpiece. The additive manufacturing process constructs each case spacer 110 as a single monolithic piece having a variable coefficient of thermal expansion. In some examples, the coefficient varies along a gradient in the direction of the snap fit.

All materials have a coefficient of thermal expansion that dictates a magnitude and rate of expansion or contraction when the material is heated or cooled. The thermal expansion and contraction of the inner air seal 120 and the spacers 110 can result in loosening of the fit between the snaps 122 and the spacers 110 during some operating conditions of the turbine engine 20. Loosening of the fit between the inner air seals 120 and the corresponding inner diameter spacers 110 can result in lost efficiency due to air leakage or aircraft component slippage. Inner diameter case spacers 110 used in existing compressor cases utilize a singular material to create each spacer 110 resulting in a spacer having a single uniform coefficient of thermal expansion.

Figure 3:
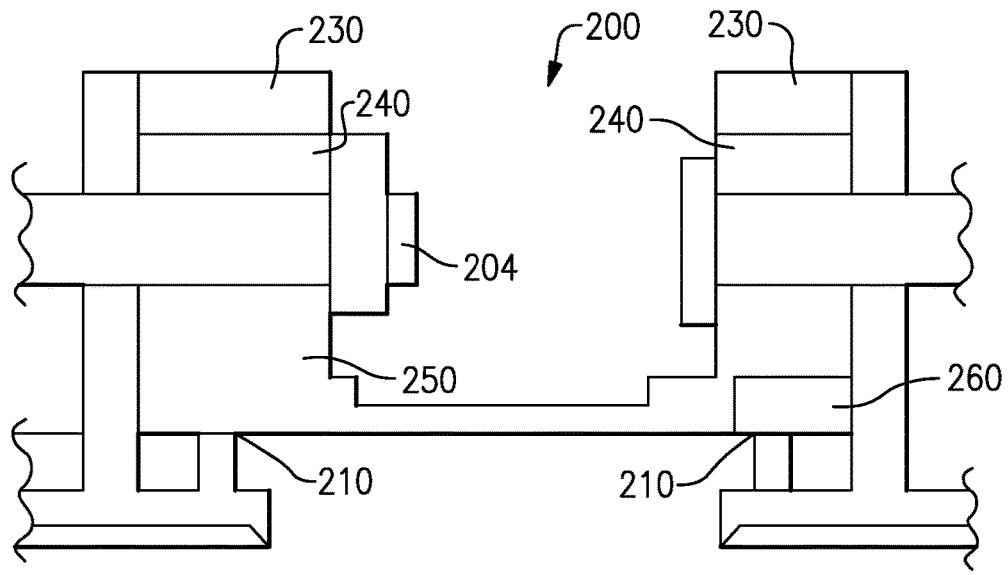
FIG. 3 schematically illustrates a first example spacer for an outer diameter compressor case assembly.

FIG. 3 schematically illustrates a first example spacer 200 for an inner diameter compressor case assembly, such as could be used in the inner diameter case assembly 100 of FIG. 2. As described above, the spacer 200 is constructed using an additive manufacturing process that applies individual layers to construct a single monolithic component. The spacer 200 utilized in the example of FIG. 3, includes multiple material layers 230, 240, 250, and 260. Each of the material layers 230, 240, 250, 260 is a specific material composition that is designed to have a specific coefficient of thermal expansion. By utilizing different layers with different coefficients of thermal expansion to construct the single monolithic spacer 200, the Spacer 200 minimizes the amount of leakage and/or part slippage that occurs during expansion or contraction of the aircraft engine 20.

In one example, a radially outer layer 230 has the smallest coefficient of thermal expansion, thereby limiting the possible radial expansion of the spacer 200. An intermediate layer 240, located between the radially outer layer 230 and a radially inner layer 250, has a coefficient of thermal expansion between the coefficients of thermal expansion of the outer layer 230 and of the inner layer 250. The radially inner layer 250 has the highest coefficient of thermal expansion. By using an intermediate layer 240 with a coefficient of thermal expansion between the coefficients of thermal expansion of the radially outer layer 230 and the radially inner layer 250, potential drawbacks associated with contact between layers having drastically different coefficients of thermal expansion are mitigated. In alternate embodiments additional intermediate layers beyond the illustrated intermediate layer 230 can be utilized.

The radially inner layer 250 is a material that has improved structural qualities, but a larger coefficient of thermal expansion than the intermediate layer 240 or the outer layer 230. The outer layer 230 and the intermediate layer 240 ensure that the snap fits 210 remain tight during all operation modes by limiting the thermal expansion of the spacer 200 of the flange thereby allowing the spacer 200 to achieve the improved structural qualities while at the same time reducing the drawbacks associated with the corresponding thermal expansion rates.

In some example inner diameter spacers 200, an additional pocket layer 260 is utilized immediately adjacent to one or more snap fit locations 210. The additional pocket layer 260 allows varied structural capabilities along the engine axis A of the turbine engine 20.

Figure 4:
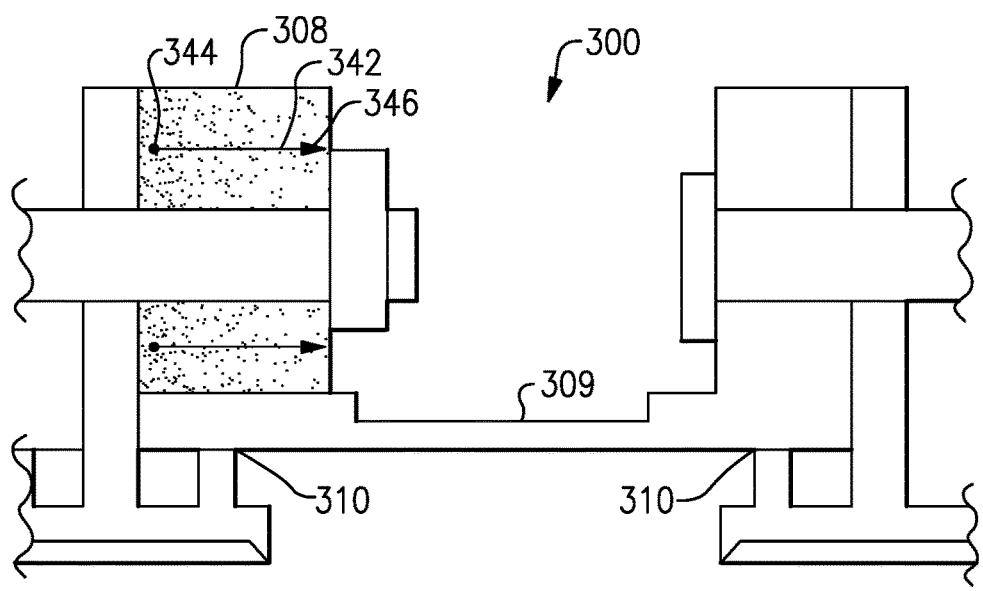
FIG. 4 schematically illustrates a second example spacer for an outer diameter compressor case assembly.
Figure 5:
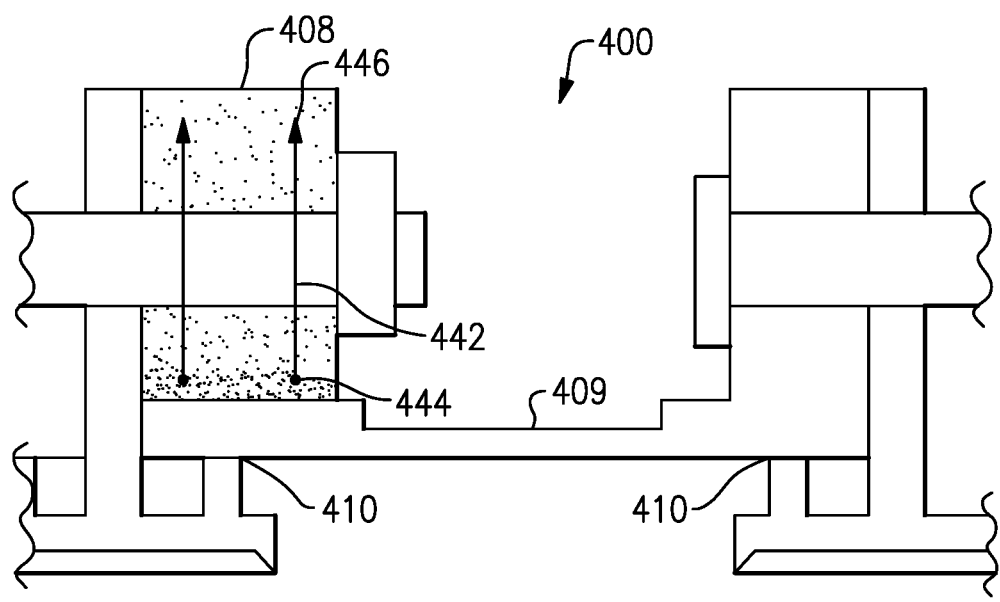
FIG. 5 schematically illustrates a third example spacer for an outer diameter compressor case assembly.

While the example of FIG. 3 illustrates a single inner diameter spacer 200 including multiple discrete layers 230, 240, 250, 260 of material with each layer having a unique coefficient of thermal expansion, it is alternately possible to use the additive manufacturing process to create a single spacer 200 that has a gradient of material composition and thus a gradient of thermal expansion rates. FIGS. 4 and 5 schematically illustrate two example inner diameter spacers 300, 400 constructed using a gradient of materials.

In the example of FIG. 4, the spacer 300 includes a flange 308 that is constructed using additive manufacturing. The flange 308 is constructed of a combination of at least two materials having different coefficients of thermal expansion. The materials are arranged such that a first material has a higher concentration relative to the second material on a fore axial end and a lower concentration relative to the second material on an aft axial end. The gradient is indicated in the figure by arrows 342, where the tail 344 of the arrow 342 is at a higher concentration of the first material and the head 346 of the arrow 342 is at a lower concentration of the first material. By creating a gradient of material concentrations in the flange 308, a gradient of coefficients of thermal expansion is also created.

In the example of FIG. 4, the coefficient of thermal expansion at the fore edge of the flange 308 (at the arrow base 344) is lower than the coefficient of thermal expansion at the aft edge of the flange 308 (the arrow head 346). Furthermore, as a result of the gradual change in concentration, the coefficient of thermal expansion gradually changes along the arrow 342, resulting in a flange 308 lacking multiple distinct layers, but including a variable coefficient of thermal expansion. This achieves the benefits described above with regards to FIG. 3, along with achieving additional structural benefits. The axially aligned gradient of coefficients of thermal expansion illustrated in the example of FIG. 4 aids in limiting the axial expansion of the spacer 300.

The spacer 400 of FIG. 5 is similar to the spacer 300 of FIG. 4, however the first material is more heavily concentrated at a radially inner edge of a flange 408 and the gradient shifts along an arrow 442. As with FIG. 3, the base 444 of the arrow 442 is at a flange 408 edge where the first material is more heavily concentrated and the head 446 of the arrow is at an edge of the flange 408 where the first material is less heavily concentrated, thereby achieving a gradient of coefficients of thermal expansion.

It is further understood that the additive manufacturing process used for the example flanges 308, 408 of FIGS. 4 and 5 can be combined to result in a gradient of coefficients of thermal expansion that shifts in both an axial direction (as in FIG. 4) and a radial direction (as in FIG. 5).

It is further understood, that while the example spacers 300, 400 of FIGS. 4 and 5 detail the material concentrations of only a single flange 308, 408, similar techniques can be utilized on both flanges 308, 408 of the spacers 300, 400 and a main body 309, 409 of the spacers 300, 400.

While the above description is written with regards to an inner diameter case for a compressor assembly, it is understood that the same principles and structures can be utilized through the case of a turbine engine (referred to as an engine case) and are not limited to cases for a compressor section. It is further understood that similar spacers can be utilized with regards to an outer diameter compressor case, or any other outer diameter case.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
a compressor section including a compressor case;
a combustor in fluid communication with the compressor section;
a turbine section including a turbine case, said turbine section in fluid communication with the combustor;
wherein at least one of said compressor case and said turbine case includes a plurality of case spacers, each of said case spacers having at least one flange;
at least one air seal, wherein each of said at least one flange is separated from an adjacent component by one of said at least one air seals;
wherein said at least one seal is snap fit to said at least one flange; and wherein at least one of said at least one flanges includes at least three distinct material layers each having a distinct thermal expansion coefficient such that the thermal expansion coefficient of the at least one flange has a gradient through the at least three distinct material layers in at least one of an axial and a radial direction relative to an axis and radius defined by the turbine engine.

2. The turbine engine of claim 1, wherein said at least one flange is constructed via an additive manufacturing process.

3. The turbine engine of claim 1, wherein each layer of the distinct material layers comprises a uniform material layer.

4. The turbine engine of claim 1, wherein said distinct material layers have a higher concentration of a first material relative to a second material on a first radial edge of the distinct material layers, and a higher concentration of said second material relative to said first material on a second radial edge of the distinct material layers.

5. The turbine engine of claim 1, wherein said distinct material layers have a higher concentration of a first material relative to a second material on a first axial edge of the distinct material layers, and a higher concentration of said second material relative to said first material on a second axial edge of the distinct material layers.

6. The turbine engine of claim 1, wherein each flange of said at least one flange is connected to a corresponding adjacent component using a fastener.

7. The turbine engine of claim 6, wherein said fastener is a bolt and nut arrangement.

8. The turbine engine of claim 1, wherein each of said case spacers is a single monolithic component.

9. A turbine engine comprising:
a plurality of case spacers, each of said case spacers having at least one flange;
at least one air seal, wherein each of said at least one flanges is separated from an adjacent component by one of said at least one air seals;
wherein said at least one air seal is snap fit to said at least one flange; and
wherein each flange of said at least one flange includes at least three distinct material layers each having a distinct thermal expansion coefficient such that the thermal expansion coefficient of the at least flange has a gradient through the at least three distinct material layers in at least one of an axial and a radial direction relative to an axis and radius defined by the turbine engine.

10. The turbine engine of claim 9, wherein each flange of said at least one flange is constructed of an additive manufacturing process.

11. The turbine engine of claim 10, wherein said additive manufacturing process is laser sintering.

12. The turbine engine of claim 9, wherein each layer of the distinct material layers comprises a uniform material layer.

13. The turbine engine of claim 9, wherein said distinct material layers have a higher concentration of a first material relative to a second material on a first radial edge of the distinct material layers, and a higher concentration of said second material relative to said first material on a second radial edge of the distinct material layers.

14. The turbine engine of claim 9, wherein said distinct material layers have a higher concentration of a first material relative to a second material on a first axial edge of the distinct material layers, and a higher concentration of said second material relative to said first material on a second axial edge of the distinct material layers.

15. The turbine engine of claim 9, wherein each flange of said at least one flange is connected to a corresponding adjacent component using a fastener.

16. The turbine engine of claim 15, wherein said fastener is a bolt and nut arrangement.

17. The turbine engine of claim 9, wherein each of said case spacers is a single monolithic component.

* * * * *